March 23, 1965
B. F. KRANE
3,174,619
TROUGHED BELT CONVEYOR
Filed Nov. 9, 1961
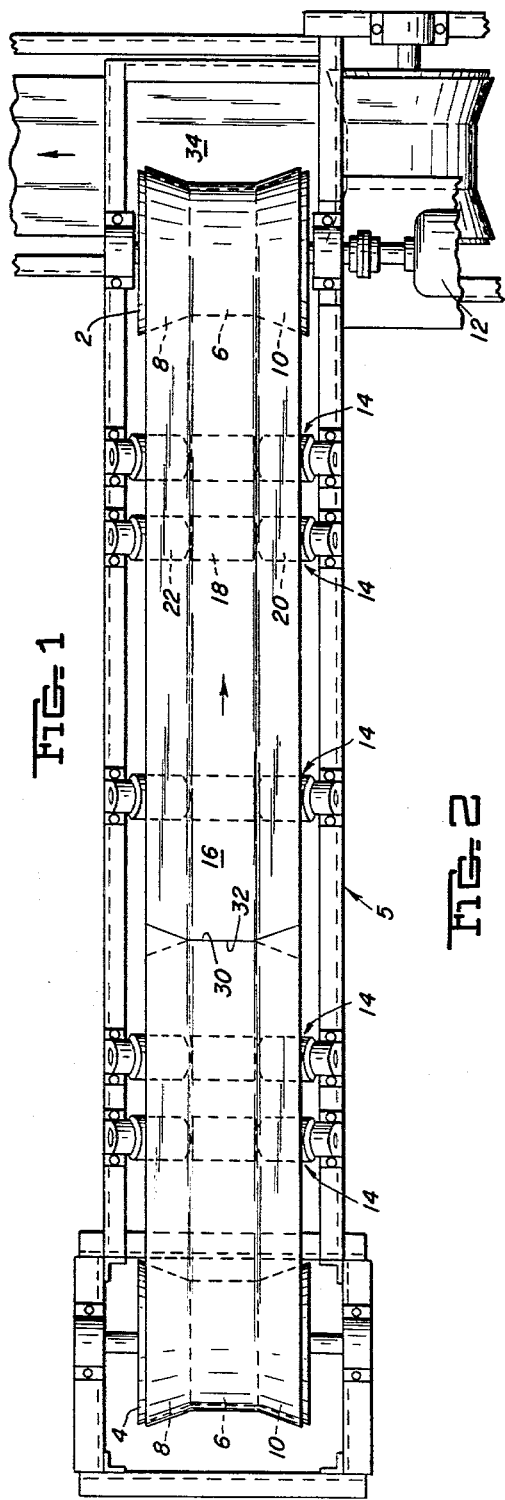
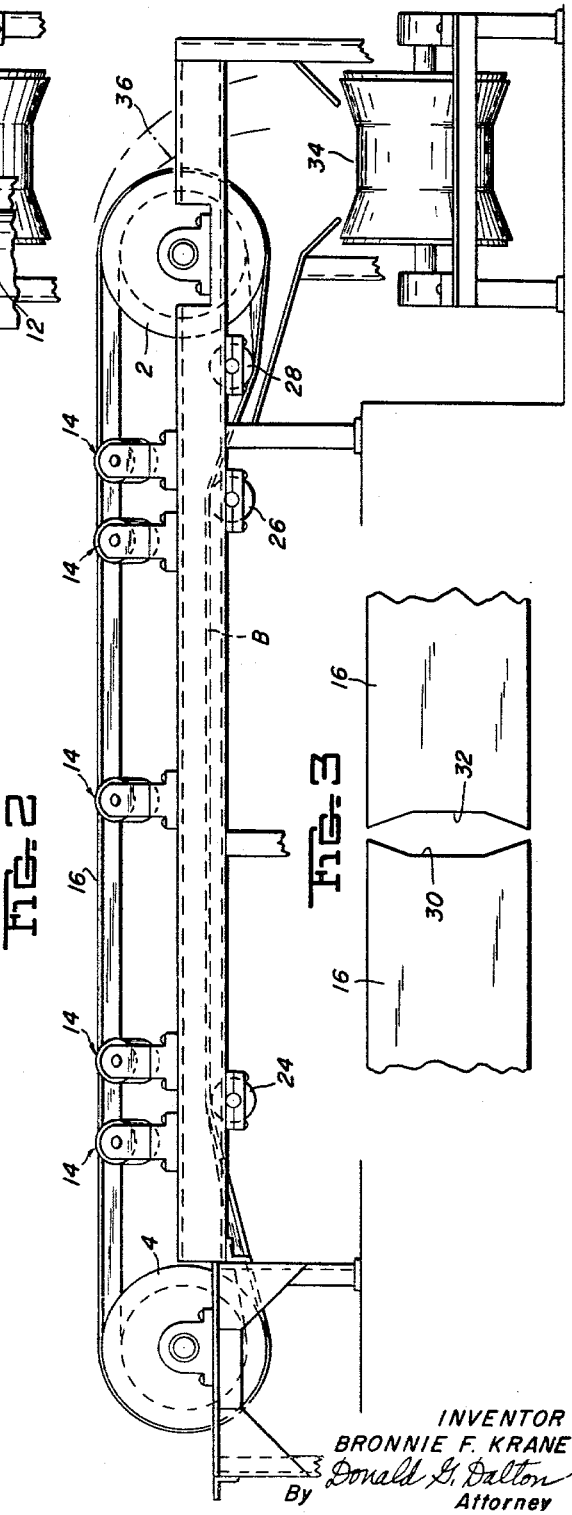
INVENTOR
BRONNIE F. KRANE
By Donald G. Dalton
Attorney

United States Patent Office 3,174,619
Patented Mar. 23, 1965

3,174,619
TROUGHED BELT CONVEYOR
Bronnie F. Krane, Hammond, Ind., assignor to United States Steel Corporation, a corporation of New Jersey
Filed Nov. 9, 1961, Ser. No. 151,338
2 Claims. (Cl. 198—230)

This invention relates to a thronged belt conveyor and more particularly to such a belt conveyor that is used to handle materials which stick to the belt. In belt conveyors of this type the head and tail pulleys are normally substantially cylindrical so that there is a tendency for the material being discharged from the belt to shoot out some distance beyond the end thereof, thus requiring additional space for equipment for receiving the material. Various devices have been provided for cleaning belt conveyors, but such devices utilize scrappers or the like which may damage the belt.

It is therefore an object of my invention to provide a troughed belt conveyor in which the material being discharged will be thrown from the conveyor in a different pattern than from previous conveyors.

Another object is to provide a troughed belt conveyor which includes means for removing material sticking to the belt without damaging the belt.

These and other objects will be more apparent after referring to the following specification and attached drawings, in which:

FIGURE 1 is a plan view of the conveyor of my invention;

FIGURE 2 is a side elevation of the conveyor of FIGURE 1; and

FIGURE 3 is a view showing the ends of the belt before being fastened together.

Referring more particularly to the drawings reference numerals 2 and 4 indicate the head and tail pulleys of a belt conveyor 5. According to my invenetion the head and tail pulleys 2 and 4 each have a small diameter cylindrical center portion 6 connecting conical end portions 8 and 10. The pulley 2 is driven by a motor 12 in the usual manner. Troughing idlers 14 are provided beneath the upper run of belt 16. The troughing idlers 14 are preferably made up of three sections 18, 20 and 22 so as to form a trough having generally the same shape as that of the end pulleys 2 and 4. Cylindrical return idlers 24 and 26 are provided for supporting the lower run B of the belt 16. According to my invention I provide a cylindrical pulley 28 between the head pulley 2 and idler 26 which bears against the top of the lower run B of the belt 16 over the full width thereof.

In making up the belt 16 its ends 30 and 32 are cut so that the center length is shorter than the edge length. The center of the ends 30 and 32 are spliced together in abutting relationship with the portions of the belt from the splice to the edges overlapping. A conveyor 34 is preferably arranged below the discharge end of the conveyor 5 for receiving material discharging therefrom.

In operation the longitudinal side sections of the conveyor belt, the ends of which overlap, are free to stretch an amount sufficient to enable it to ride over the conical portions 8 and 10 of the end pulleys. Since most of the material being conveyed is kept in the trough of the conveyor belt its discharge from the end pulley 2 is at the point of least diameter and therefore along a path indicated by line 36. The cylindrical pulley 28 will flatten out the belt 16 as soon as it leaves the pulley 2. This action causes the side sections of the belt to shift with respect to the center section in a common plane and also imparts a downward movement to the center trough section as it flattens out the trough. This downward movement of the belt trough is imparted to the material adhering to the belt and this movement in combination with the horizontal shifting of the side sections of the belt and the flattening of the belt will cause any materials adhering to the belt to vibrate loose. In place of the belt shown any belt having sufficient elasticity to allow stretching over the end pulleys may be used. Also, the shape of the end pulleys may vary from that shown as long as they are troughed.

While one embodiment of my invention has been shown and described it will be apparent that other adaptations and modifications may be made without departing from the scope of the following claims.

I claim:

1. A conveyor comprising troughed head and tail pulleys, a resilient belt passing around said head and tail pulleys, a substantially cylindrical roll arranged close to said head pulleys and bearing against the top side of the lower run of the belt over the full width thereof, and a substantially cylindrical idler roll spaced from said first named cylindrical roll toward said tail pulley and bearing against the bottom side of the lower run of the belt, the top of said idler roll being in a plane above the bottom of said head pulley.

2. A conveyor according to claim 1 in which the belt has longitudinal edges longer than the center length with the ends of the center length being spliced together and the longitudinal edges overlapping.

References Cited in the file of this patent
UNITED STATES PATENTS

| | | |
|---|---|---|
| 2,564,680 | Faller | Aug. 21, 1951 |
| 2,593,284 | Ewell | Apr. 15, 1952 |
| 2,688,394 | Hurd et al. | Sept. 7, 1954 |

FOREIGN PATENTS

| | | |
|---|---|---|
| 211,591 | Germany | Aug. 18, 1908 |